United States Patent [19]
Dorr et al.

[11] 3,716,824
[45] Feb. 13, 1973

[54] SIDE LOOKING SONAR APPARATUS

[75] Inventors: John A. Dorr, Crofton Park; Henry M. Gruen, Annapolis, both of Md.

[73] Assignee: Westinghouse Electric Corporation, Pittsburgh, Pa.

[22] Filed: Oct. 17, 1969

[21] Appl. No.: 867,170

[52] U.S. Cl. .................................340/3 R, 340/8 R
[51] Int. Cl. ..................................................G01s 9/66
[58] Field of Search .............340/3, 3 F, 8, 9, 10, 8 L, 340/1 R

[56] References Cited

UNITED STATES PATENTS

| | | | |
|---|---|---|---|
| 3,359,537 | 12/1967 | Geil et al. | 340/8 |
| 3,458,854 | 7/1969 | Murphree | 340/3 |
| 3,366,922 | 1/1968 | Kay | 340/1 |

*Primary Examiner*—Richard A. Farley
*Attorney*—F. H. Henson, D. Schron and E. P. Klipfel

[57] ABSTRACT

An arcuate side looking sonar transducer transmits acoustic energy to the sea bottom. Reflected acoustic energy is received by a pair of relatively short receiver transducers positioned over the ends of the transmitter transducer.

7 Claims, 14 Drawing Figures

INVENTORS
JOHN A. DORR &
HENRY M. GRUEN $$R_\alpha = \frac{\sin\left(\frac{L\pi}{\lambda}\sin\alpha\right)}{\left(\frac{L\pi}{\lambda}\sin\alpha\right)}$$

$$R'_\alpha = \cos\left(\frac{L\pi}{\lambda}\sin\alpha\right)$$

SIDE LOOKING SONAR APPARATUS

BACKGROUND OF THE INVENTION

1. Field of the Invention

The invention in general relates to sonar, and more particularly a side looking sonar system which transmits acoustic energy to, and receives reflected acoustic energy from, a narrow strip on a target area such as the sea bottom.

2. Description of the Prior Art

In side looking sonar systems an elongated transducer is generally mounted on a carrier vehicle which travels either on or below the water surface along a course line. Acoustic energy is propagated in a very narrow fan-shaped beam pattern toward a target area, the sea bottom, by the transducer and energy reflected from the bottom or objects on the bottom is picked up by receiver transducer apparatus. As the carrier vehicle continues along its course line a display unit such as a storage tube or paper recorder portrays a picture of the bottom in accordance with each reflected transmitted signal. The resultant display is similar to a picture on a television screen in that the entire picture is formulated by a plurality of parallel lines or sweeps with each sweep being the portrayal of a reflected transmitted signal.

One type of side looking sonar transducer has been developed wherein the transducer is of a curved elongated configuration. The curved transducer is used for high resolution applications and the carrier vehicle travels at a relatively short altitude above the bottom, for example 20 ft. The curved transducer has a radiating surface arranged on the arc of a circle whose radius is the design altitude and acoustic energy is focused along a line of focus on the sea bottom. The curvature of the arc approximately matches the wave front curvature of the reflected acoustic energy and variation in the design altitude may result in defocusing and a consequent degradation of the display. To allow for a greater variation in altitude the transducer may be made shorter, however this has the effect of degrading system resolution.

It is therefore an object of the present invention to provide a focused side looking sonar transducer apparatus which provides for a large depth of focus, that is a large altitude variation, while not being excessive in length.

SUMMARY OF THE INVENTION

Side looking sonar apparatus is provided which includes a transmitter transducer means having an elongated radiating surface extending between two end points and operable at a frequency F. First and second receiver transducers each operable at that frequency F and each being much smaller than the transmitter transducer are spaced apart and positioned proximate opposite ends of the transmitter transducer. The output signals provided by the receiver transducers are coupled to a receiver means for providing signals to a display apparatus.

DESCRIPTION OF THE PREFERRED EMBODIMENT

Figure 1A:
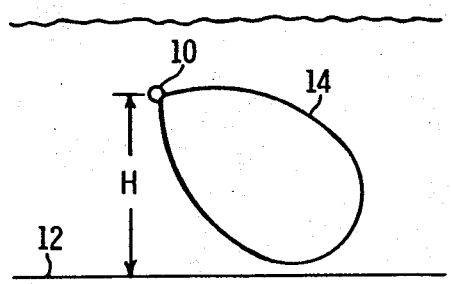
FIGS. 1A and 1B show an elevational and a plan view, respectively, of a typical side looking sonar beam pattern.
Figure 1B:
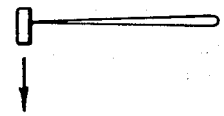

In FIG. 1A, illustrating a typical side looking sonar application, a carrier 10 proceeds along a course line (toward the viewer) at a predetermined altitude H above the sea bottom 12. Although sea bottom is mentioned it is obvious that the apparatus may be used over different target areas and in various bodies of water. Side looking sonar apparatus aboard the carrier 10 has associated therewith a pancake shaped beam pattern 14 being wide in a generally vertical plane and being relatively narrow in a generally horizontal plane, as illustrated in FIG. 1B which is a view looking down on the apparatus of FIG. 1A. For increased coverage of the target area, port and starboard transducer means may be provided and may simultaneously operate at slightly different frequencies of operation or may operate sequentially at the same frequency. The transducer which provides such a beam pattern has a radiating or active surface which is very long compared to its width. For example, in terms of wavelength $\lambda$, its length $L$ may be over 150 $\lambda$ and its width, less than 1 $\lambda$ where $\lambda$ is the wavelength of the operating frequency in the fluid medium in which the transducer operates.

Figure 2:
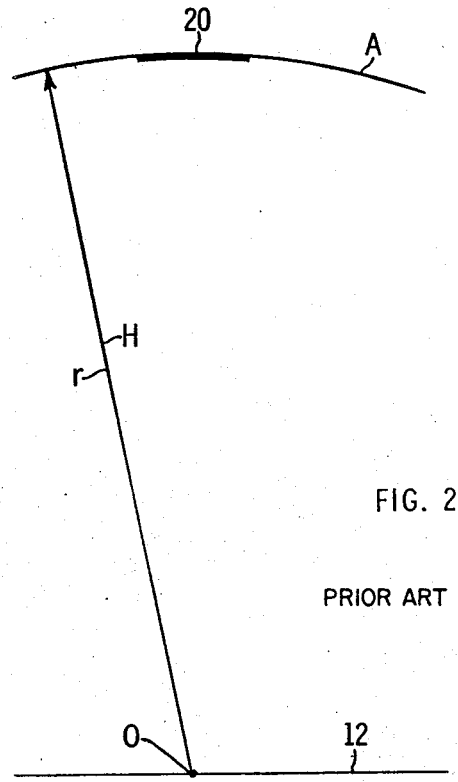
FIG. 2 illustrates a typical side looking sonar focused transducer.

For high resolution work use is made of a curved transducer such as illustrated in FIG. 2. The transducer 20, representative of the prior art, is arranged to lie along a curve A, the curve A being a section of a circle having the center O and a radius $r$. Depending upon the operating frequency and by way of example, the transducer 20 may be several feet long and may be made up of a plurality of transducer active elements such as barium titanate, arranged in end-to-end relationship. The width of a typical element may be a fraction of an inch so that the radiating surface is several feet long times a fraction of an inch and accordingly for purposes of illustration and discussion the transducer will be considered to be a thin line.

If the transducer 20 is designed to travel at an altitude H equal to the distance $r$ then point O will lie on the sea bottom 12 and the energy radiated at any instant of time from any point on the transducer 20 will arrive at point O simultaneously with the arrival of energy transmitted by the remaining points of the transducer. If point O is extended perpendicularly to the plane of the circle A then each point of the transducer 20 will be equally distant from any point on that extension of point O. This is illustrated more particularly in FIG. 3.

Figure 3:
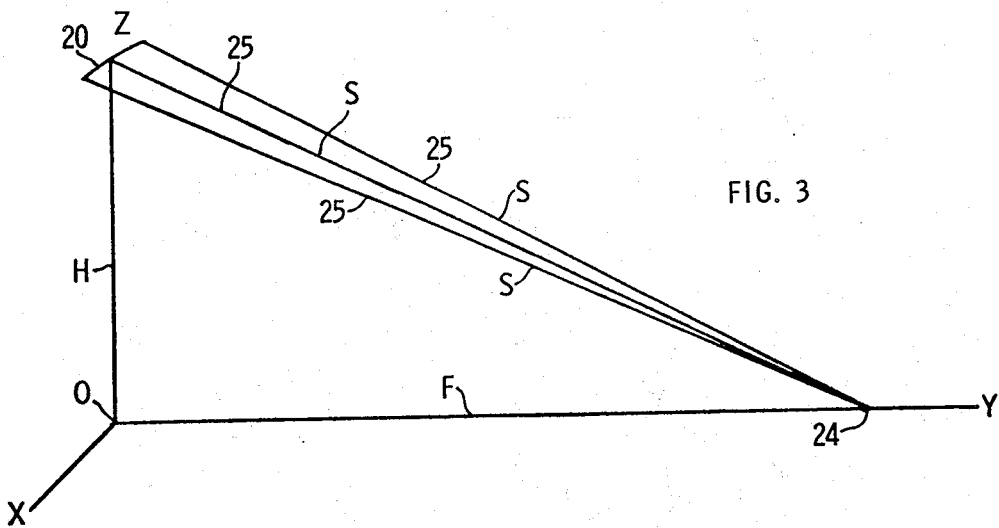
FIG. 3 illustrates the transducer of FIG. 2 positionally oriented in an $xyz$ coordinate system.

FIG. 3 illustrates an $xyz$ coordinate system with the transducer 20 of FIG. 2 being positioned in the $xz$ plane at an altitude or distance H from the origin O. Each point on transducer 20 is at the same distance H from O since the transducer lies on the arc of a circle centered about O. Line F known as the line of focus is perpendicular to the plane of the circle (the $xz$ plane) at point O and any point on line F is equally distant to all points on the transducer 20. A line from point 24 drawn to the intersection of the transducer 20 and the $z$-axis is designated 25 and has a length S, S being the slant range to point 24. The lines 25 joining the end points of the transducer 20 with point 24 are also of a distance equal to S. The lines joining point 24 with each and every point on the transducer 20 would form a section of a cone.

If the transducer 20 is supplied with the proper electrical energy it will transmit acoustic energy in a certain beam pattern, or if a receiver, transducer 20 will provide a corresponding electrical output signal in response to the receipt of the proper acoustic energy and in accordance with its receiver beam pattern. If, in FIG. 4, transducer 20 transmits an acoustic signal, the acoustic pressure at a point such as 27 on the line of focus F is of a certain value. The pressure at an adjacent point 28 in the $xy$ plane will be of a relatively lesser value. The angle $\alpha$ is formed by the lines joining the transducer 20 with respective points 27 and 28.

The radiation pattern at any distance along the line of focus F may be approximately defined by:

$$R_\alpha = \frac{\sin(\pi L/\lambda \sin \alpha)}{\pi L/\lambda \sin \alpha} \quad (1)$$

where: $L$ is the length of transducer 20, $\lambda$ is the wavelength of the operating frequency, $\alpha$ is the angle illustrated in FIG. 4 and $R_\alpha$ is the ratio of response at angle $\alpha$ relative to that on the line of focus, that is, the ratio of response at point 28 relative to point 27.

Point 28 is representative of any point on either side of the line of focus F at point 27. The radiation pattern on the target area (the $xy$ plane) at a typical point such as point 27 is illustrated in FIG. 4A wherein the angle $\alpha$ is plotted on the horizontal axis from $+90°$ to $-90°$ or from $+\pi/2$ to $-\pi/2$ in terms of radians. The vertical axis represents normalized acoustic sound pressure. That is, the maximum acoustic sound pressure at the particular point 27 in question, has been given an arbitrary value of one with all sound pressures being relative to the maximum and therefore falling between 0 and 1. The vertical scale of FIG. 4A has also been labeled in decibels (db). This designation is another manner of stating relative pressures and since the pressure will be a maximum of one or less, the pressure designation will be $-$db or db down. For example, the maximum point 1.0 on the relative pressure scale will be equivalent to zero db; a pressure of approximately 0.7 of maximum is said to be $-3$db or 3db down and a pressure of approximately 0.1 is said to be $-20$ or 20db down. The width of the beam is generally given at some reference level. By way of example, the $-3$db points may be chosen as the reference and the width of the beam represented by the pattern of FIG. 4A therefore will be equal to $\theta$.

A beam pattern such as in FIG. 4A and which in actuality is a plot of equation (1), is associated with each and every point along the line of focus F. If maximum acoustic energy is assumed to fall within the 3db beam width, that is for an angular distance $\theta$ on either side of the line of focus F, then a narrow strip straddling the line of focus F is insonified on the sea bottom or conversely, if the transducer is a receiver, maximum acoustic energy will be detected from this narrow insonified strip.

Figure 4:
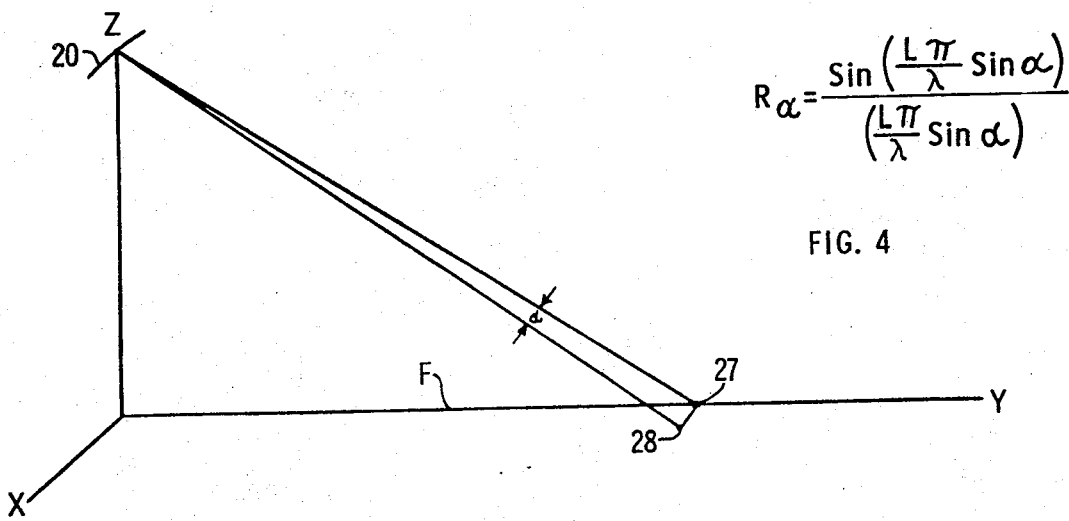
FIG. 4 illustrates transducer means positioned in an $xyz$ coordinate system to aid in an understanding of transducer response.
Figure 4A:
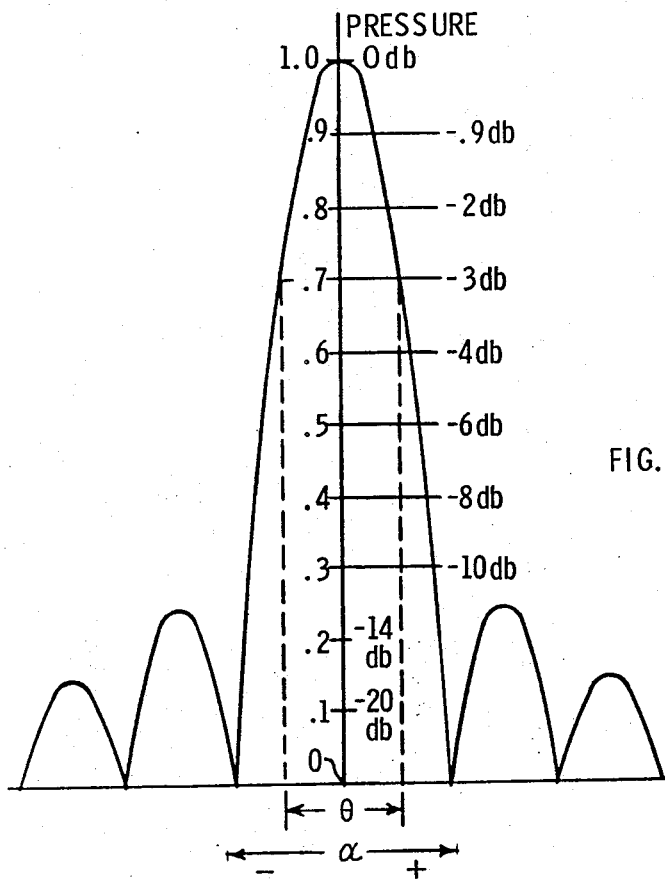
FIG. 4A illustrates a beam pattern for the arrangement of FIG. 4.

If the transducer 20 of FIG. 4 is also used as a receiver, or if a similar transducer is provided as a receiver, the resolution for such a configuration is defined as the 3db beam width of the oneway pattern or the 6db beam width of the combined or composite beam pattern which is $R_\alpha \times R_\alpha$, or $R_\alpha^2$.

Figure 5:
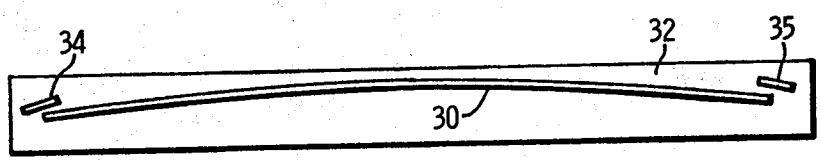
FIG. 5 illustrates a preferred embodiment of the present invention.
Figure 6:
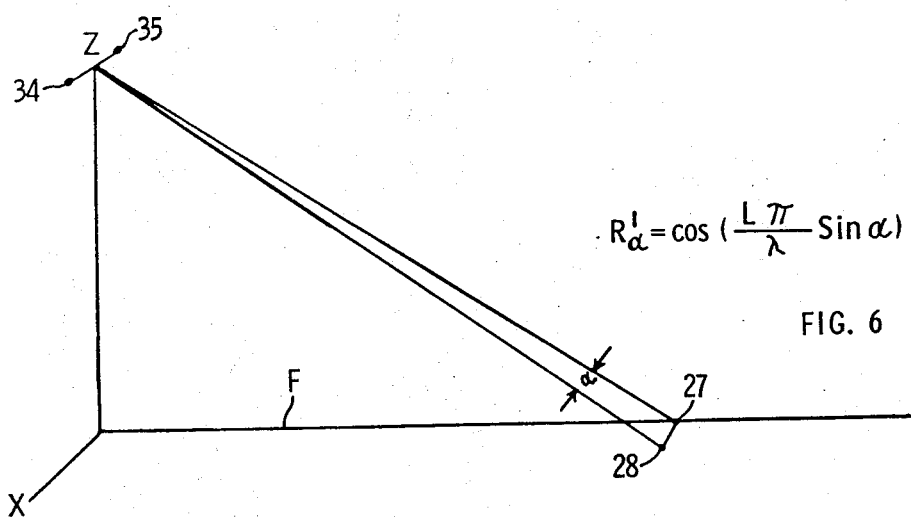
FIG. 6 illustrates spaced apart transducers positioned in an $xyz$ coordinate system.

The present invention utilizes an elongated side looking sonar transducer such as transducer 20 in FIG. 4 for transmitting acoustic energy toward the sea bottom, in conjunction with first and second relatively short receiver transducers positioned proximate opposite ends of the transmitter transducer. FIG. 5 which is exemplary illustrates a transmitter transducer 30 that has an elongated radiating surface extending between end points and is carried by mounting means 32. A first receiver transducer 34 is carried by the mounting means and is positioned proximate one end of the transducer 30 and a second receiver transducer 35 is proximate the opposite end of the transducer 30. Preferably, the center point of each relatively short receiver transducer is positioned right over a respective end point of the transducer 30. The receive pattern of the spaced apart transducers 34 and 35 is best demonstrated with reference to FIG. 6 wherein the receiver transducers are illustrated as points 34 and 35 in the $xz$ plane and separated by a distance $L$ equal to the length of transducer 30. To serve as a comparison with the arrangement of FIG. 4, point 27 on the line of focus F is again chosen and point 28 is representative of any point on either side of the line of focus F and disposed at an angle $\alpha$ where $\alpha$ is formed by the lines from the $z$ axes to points 27 and 28. The relative response, that is the ratio of response at point 28 relative to point 27 is given by the formula:

$$R_\alpha' = \cos(\pi L/\lambda \sin \alpha). \quad (2)$$

Figure 6A:
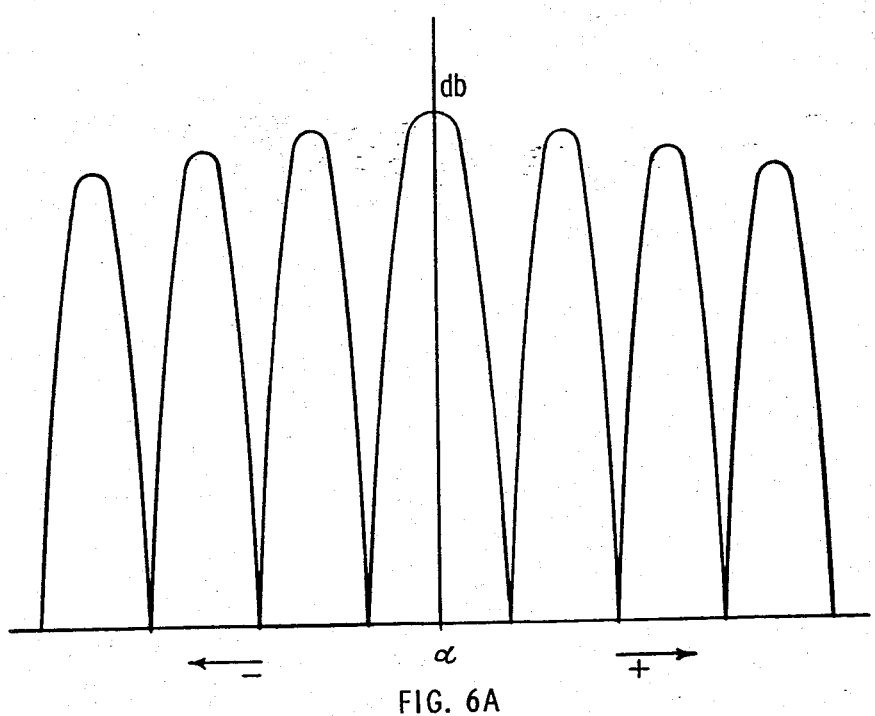
FIG. 6A illustrates a beam pattern for the arrangement of FIG. 6.

This beam pattern is plotted in FIG. 6A wherein the horizontal axis represents $\alpha$ and the vertical axis represents relative pressure, as in FIG. 4A.

In the arrangement of FIG. 5, the beam pattern of transmitter transducer 30 substantially follows equation (1) and the curve of FIG. 4A whereas the pattern of the receiving array, that is receiver transducers 34 and 35 is substantially described by equation (2) and the curve of FIG. 6A. The composite beam pattern is:

$$R_\alpha R_\alpha' = \frac{\sin(2\pi L/\lambda \sin \alpha)}{2\pi L/\lambda \sin \alpha} \quad (3)$$

The round trip or composite beam pattern for a transmitter transducer such as 30 in conjunction with a receiver transducer such as 30 is defined by the relationship:

$$R_\alpha R_\alpha = \text{Sin}^2 \frac{\left(\frac{\pi L}{\lambda} \sin \alpha\right)}{\left(\frac{\pi L}{\lambda}\right)^2 \sin^2 \alpha} \quad (4)$$

Figure 7:
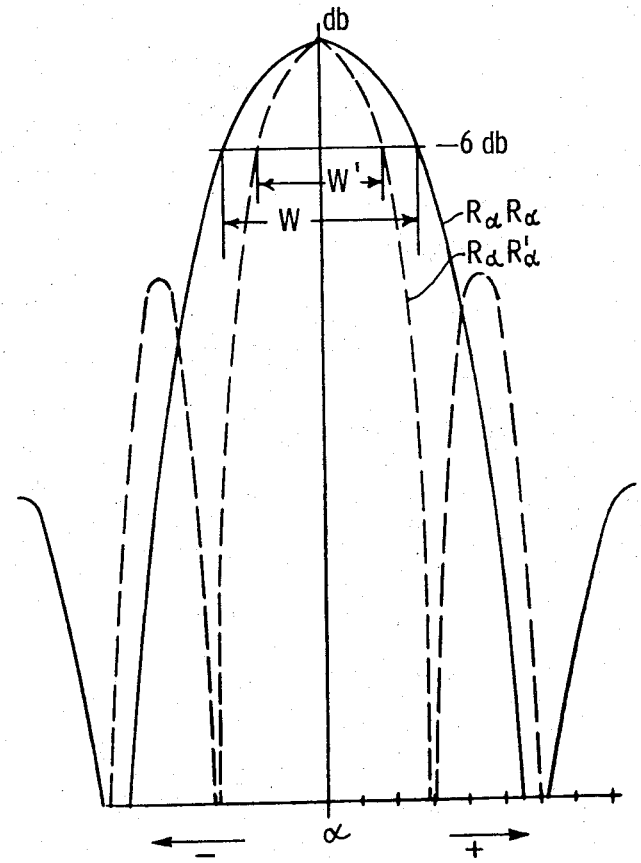
FIG. 7 illustrates a combined beam pattern of prior art apparatus as compared with the apparatus of FIG. 5.

In FIG. 7 there is a plot of equation (3) as compared with equation (4) and it may be mathematically shown that the width at the −6db, which is an indication of system resolution, is approximately 40 percent greater for the $R_\alpha R_\alpha$ curve than it is for the $R_\alpha V_\alpha'$ curve. In other words utilizing an arrangement such as illustrated in FIG. 5 in accordance with the teachings of the present invention there results a side looking sonar system which has greater resolution than an equal length side looking sonar transducer arrangement of the prior art. Accordingly, for equal resolutions, the present invention allows for a shorter length transducer for those particular situations where space and weight consideration are of concern.

By having apparatus which has the same resolution as a longer transducer apparatus there results in yet another benefit, and that is an increase in the depth of focus of the apparatus.

For bottom ranges from directly beneath the transducer out to a maximum range, the depth of focus varies inversely as the square of the length of the transducer. For bottom ranges approximately equal to or less than the magnitude of altitude H, the depth of focus is approximately proportional to $H^2/L^2$. For greater bottom ranges the depth of focus is approximately proportional to $H/L^2$. Therefore in the present invention by decreasing the length L of the apparatus the depth of focus is increased, however, without sacrificing resolution.

Figure 8:
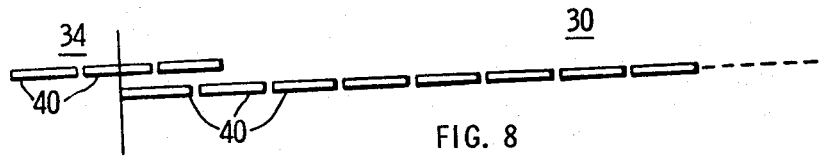
FIG. 8 illustrates a portion of the apparatus of FIG. 5 in somewhat more detail.

FIG. 8 illustrates in somewhat more detail, transducer 34 and a portion of transducer 30 of FIG. 5. The transmitter transducer 30 includes a plurality of active elements 40 arranged in end-to-end relationship along a line and electrically connected together by means well known to those skilled in the art. A receiver transducer 34 is positioned directly over the end of transducer 30 and it also includes a plurality of active elements 40, the exact number of active elements being dependent upon design considerations of the apparatus. By way of example, with an operating frequency of 150 KHz and a wavelength of 0.4 inch each active element 40 may be several inches long and may have a width of ¾ λ. The length of the transmitter transducer 30 from end-to-end, in terms of wavelength, may be approximately 162 λ and each receiver transducer such as 34 may be of a length approximately 27 λ comprised of three 3½ inch long elements.

Figure 9:
FIGS. 9 and 10 illustrate two different types of receiver orientations which may be utilized herein.
Figure 10:
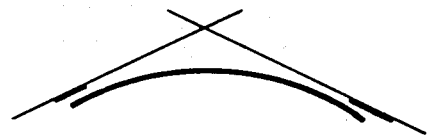

The length of the receiver transducers 34 and 35 are relatively much smaller than the length of the transmitter transducer 30 and the active elements making up the receiver transducers may either lie on a curved line as in FIG. 9 in which the curvature of the transducer 30 and the arc upon which the receivers lie have been exaggerated. As an alternative, and as illustrated in FIG. 10 the receiver transducers 34 and 35 are positioned to lie on respective straight lines.

Figure 11:
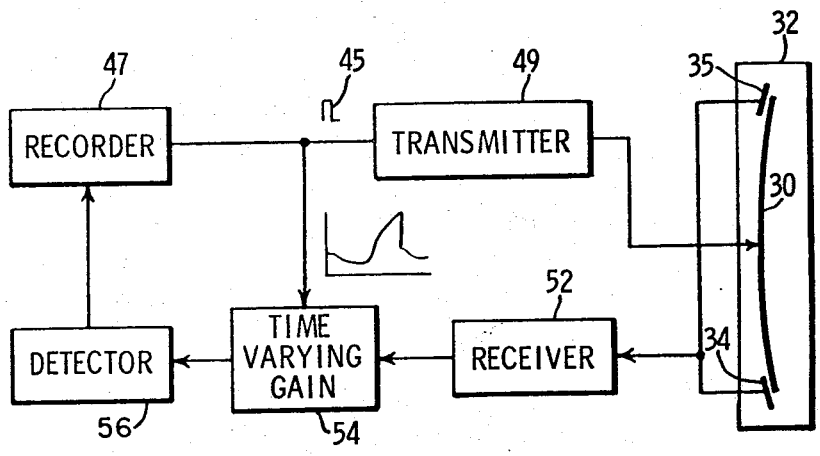
FIG. 11 is a block diagram of an operative side looking sonar system utilizing the apparatus of FIG. 5.

FIG. 11 illustrates, in block diagram form, an operative side looking sonar system incorporating the apparatus of FIG. 5, for examining a target area to one side of a carrier vehicle. Upon the application of suitable command pulse 45, which may be provided by the recorder 47, the transmitter 49 will provide an electrical signal to the transmitter transducer 30 which thereupon transmits an acoustical signal of wavelength λ toward the target area in a narrow insonified strip. Reflected acoustic energy of wavelength λ is received by the receiver transducers 34 and 35 electrically tied together and which provide their corresponding output signal to receiver 52. In order to provide for a somewhat uniform intensity of the return signal (in the absence of a target) the receiver 52 output which decreases in amplitude with respect to time is operated upon by the time varying gain means 54 which varies gain in accordance with the illustrated curve. Such technique is well known to those skilled in the art. The detector 56 which receives the output of the time varying gain means 54 provides an output signal, indicative of the reflected acoustic energy, to recorder means 47 which then provides the desired display. Such recorder means 47 may be for example magnetic tape storage for future display, cathode ray storage tube apparatus, or helical wire/electro-sensitive paper unit, to name a few.

Although the present invention has been described with a certain degree of particularity, it should be understood that the present disclosure has been made by way of example in modifications and constructional details and variations of the present invention are made possible in the light of the above teachings.

We claim as our invention:

1. Side looking sonar apparatus comprising:
   a. transmitter transducer means having an elongated radiating surface extending between end points and operable at a frequency F;
   b. first and second receiver transducer means each operable at said frequency F;
   c. said first and second receiver transducer means being spaced apart and positioned proximate opposite ends of said transmitter transducer;
   d. said transmitter transducer means being only for projection of acoustic energy during operation, with said first and second receiver transducer means being exclusively for reception of reflected acoustic energy;
   e. said first and second receiver transducer means being electrically connected together for providing a unitary output signal indicative of said reflected acoustic energy.
2. Apparatus according to claim 1 wherein:
   a. said elongated radiating surface of said transmitter transducer means lies along a curved line.
3. Apparatus according to claim 1 wherein:
   a. each of said receiver transducer means has an elongated receiving surface.
4. Apparatus according to claim 3 wherein:
   b. said elongated receiving surfaces of said receiver transducer means lie along a curved line.
5. Apparatus according to claim 3 wherein:
   a. said elongated receiving surfaces of said receiver transducer means lie along respective straight lines.
6. Apparatus according to claim 1 wherein:

a. the length of said elongated radiating surface of said transmitter transducer means is $L$; and
b. the distance between the centers of said first and second receiver transducer means is substantially $L$.

7. Side looking sonar apparatus comprising:
a. transmitter transducer means having an elongated radiating surface extending between end points and operable at a frequency F;
b. transmitter means for supplying said transmitter transducer means with electrical energy for transmission of an acoustic signal having a wavelength $\lambda$;
c. first and second receiver transducer means each responsive to reflected acoustic energy of said wavelength $\lambda$ for providing corresponding electrical output signals;
d. receiver means;
e. means for electrically connecting only said first and second receiver transducer means with said receiver means; and
f. means operably connected to said receiver means for recording indications of said output signals.

* * * * *